United States Patent [19]

Riley

[11] 4,329,930
[45] May 18, 1982

[54] DRAFT AIR DEFLECTING DEVICE

[75] Inventor: James E. Riley, Sparks, Nev.

[73] Assignee: Alpine Manufacturing Company, Inc., Sparks, Nev.

[21] Appl. No.: 175,856

[22] Filed: Aug. 6, 1980

[51] Int. Cl.³ .............................................. F23M 7/00
[52] U.S. Cl. ............................... 110/175 R; 110/310; 126/193; 126/200
[58] Field of Search .............................. 126/200, 193; 110/175 R, 174, 175 A, 182, 310

[56] References Cited

U.S. PATENT DOCUMENTS

| 119,949 | 10/1871 | Perry et al. | 126/193 |
| 220,528 | 10/1879 | Greene | 126/193 |
| 434,893 | 8/1890 | Scott | 126/200 |
| 2,135,899 | 11/1938 | Jenson | 110/175 R |
| 3,986,488 | 10/1976 | Hannebaum | 126/200 X |
| 4,113,439 | 9/1978 | Ookubo et al. | 126/200 X |
| 4,154,212 | 5/1979 | Wilkinson | 126/193 X |

Primary Examiner—Edward G. Favors
Attorney, Agent, or Firm—Harvey B. Jacobson

[57] ABSTRACT

A draft air deflecting device is mountable proximate to a window contained in a firebox and serves as a conduit which directs draft air across the inner surface of the window prior to its supporting combustion of the fuel in the firebox. In this respect, the draft air deflecting device is formed as a box which communicates with draft air holes located in the firebox and which includes a forwardly extending lip serving to define a nozzle for both increasing the velocity and directing the incoming draft air across the firebox window. The incoming draft air is thus utilized to cool and to prevent soot, creosote and other particulates from accumulating on the window.

13 Claims, 4 Drawing Figures

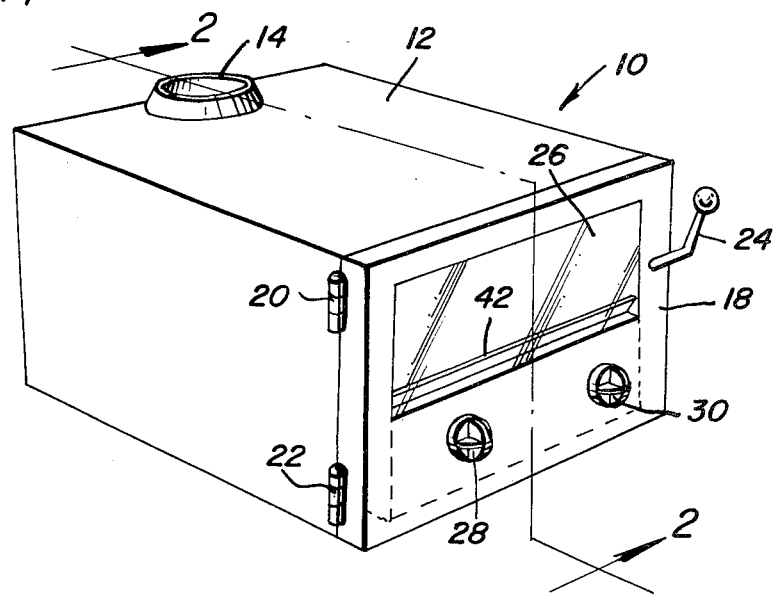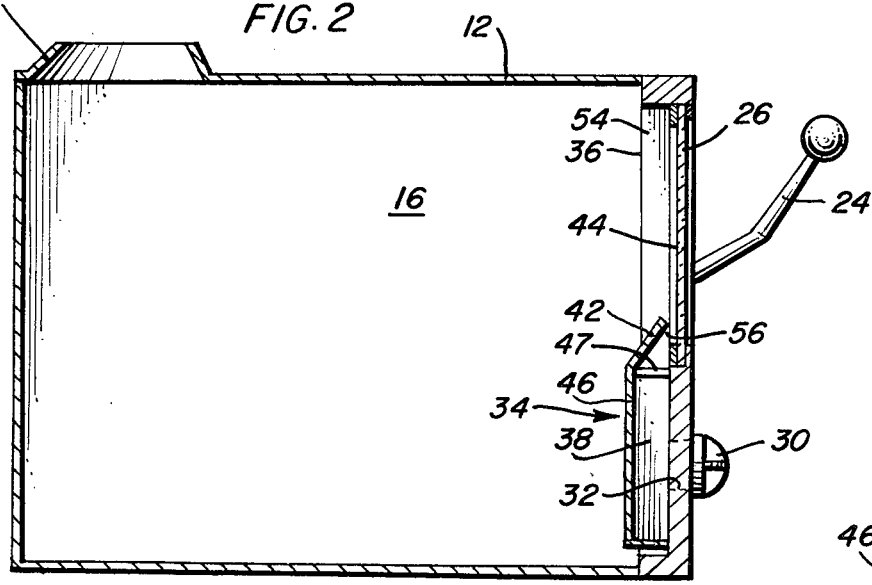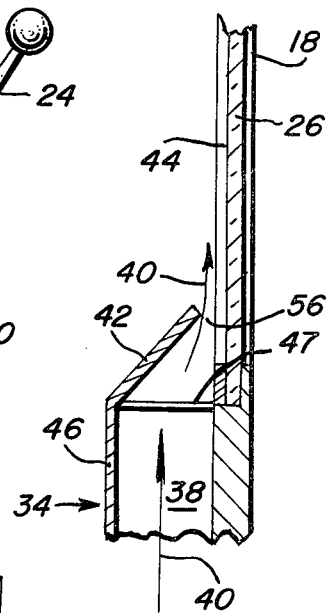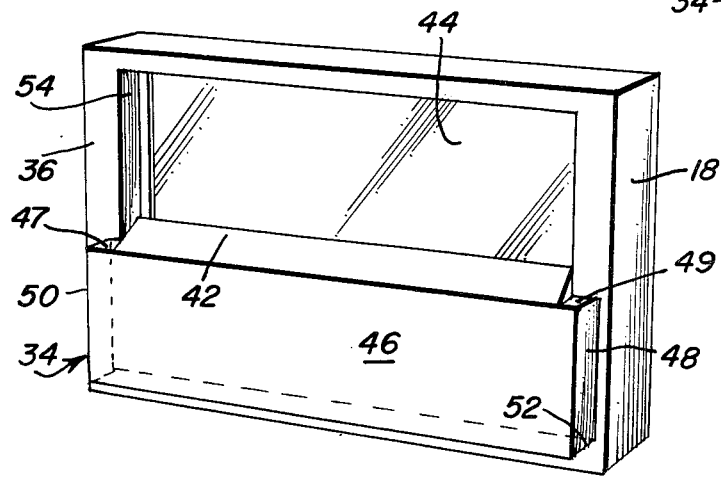

DRAFT AIR DEFLECTING DEVICE

BACKGROUND OF THE INVENTION

1. Field of the Invention

The present invention relates to a draft air deflecting device and more particularly pertains to a draft air deflector utilizable in combination with a firebox having a window thereon wherein the deflector directs draft air directly across the window at a high velocity thereby to cool and clean the same.

2. Description of the Prior Art

One of the more critical problems confronting developers of various types of stoves has been the design of stove doors which have windows positioned therein to permit a viewing of a combustion process. In this respect, there has continuously existed a need for keeping these windows cool and clean, and the attempts to meet this need have been many and varied. Additionally, it has been a long recognized and utilized design feature to heat draft air provided to a combustion process prior to its being directed to the combustion area and as such, there has evolved a number of designs for stove doors which utilize draft air deflectors to facilitate the heating of draft air prior to its entry into a combustion process.

For example, U.S. Pat. No. 42,935, issued May 31, 1864, to Fares et al, is representative of an early recognition of the desirability for heating draft air prior to its being utilized in a combustion process. In this connection, Fares et al disclose a stove door having draft air entry holes provided on a topmost portion thereof and being of a hollow construction whereby the draft air must travel substantially through a length of the door prior to its emergence from a bottommost portion into a combustion space. In that the door lies proximate to the source of combustion, it will necessarily become heated and thus draft air traversing through the hollow portion thereof will be similarly heated before being used in combustion. Similarly, U.S. Pat. No. 119,949, issued Oct. 17, 1871, to Perry et al, again reiterated this recognition of the desirability of heating draft air by providing for a stove door and draft deflector utilized in combination therewith to direct draft air through a double flow path for heating prior to combustion. In this regard, draft air entry apertures are provided on a stove door whereby the draft air must traverse a hollow portion of the door for a first heating operation and then exits into a firebox space to flow along a wall permanently attached to the stove so as to be further heated before combustion.

Along with this early recognition of a need for heating draft air, there was additionally some attempts to utilize the draft air for cooling specific portions of an outside surface of a stove. For example, U.S. Pat. Ser. No. 82,637, issued Sept. 29, 1868, to Redway, discloses the use of a stove door having air entry holes in communication with a hollow chamber, said hollow chamber having a plurality of apertures for directing the flow of draft air in a manner which controls the position of the flame within the combustion space. Effectively, the purpose of this stove door was not to heat the draft air but rather to prevent the fire from coming into contact with the firebox walls so as to protect an outside mica surface on the stove, since overheating of the outside surface would result in the mica cracking thus destroying the aesthetic appearance thereof.

There has been at least one attempt to design a stove door which has windows positioned therein and which utilizes draft air as a means of cleaning these windows. In this connection, U.S. Pat. No. 111,020, issued Jan. 17, 1871, to Van Benthuysen, discloses a stove door having a plurality of apertures positioned around the edges thereof and utilizing a frame member which serves as a deflector for directing the incoming draft air across an internal surface of a window so as to prevent a deposit of soot or fine ashes thereon. While this construction at least partially solves the problem of keeping a stove window clean, it does so in a very inefficient manner since an even, uniform flow of draft air is not provided across the window glass. In this regard, the apertures at best provide for a plurality of different flows of air moving in different directions depending on the vacuum within the firebox as created by the combustion process. Further, the air is not directed inwardly through the stove door in a manner which increases its velocity to thereby provide an increased cooling and cleaning effect. As such, the Benthuysen device is illustrative of the problems still existing in the art which the present invention seeks to overcome.

SUMMARY OF THE INVENTION

The general purpose of the present invention is to provide for a draft air deflector that has all of the advantages of similarly employed draft air deflecting devices and has none of the above-described disadvantages. To attain this, the present invention provides for a draft air deflector which is mountable on an inside surface of a stove door having a window positioned therein and which serves to increase the velocity of incoming draft air and to distribute the same in an even and uniform manner across the window surface thereby to continuously clean and cool the same. The invention essentially comprises a box-like structure which is sealed against the inside of a stove door and which communicates with draft air openings extending through the door. The deflector receives draft air coming through the draft air openings and directs the same past a forwardly extending lip integrally attached thereto, such lip effectively serving as a velocity nozzle so as to increase the speed of movement of the draft air as it passes therethrough. The forwardly extending lip and the window glass of the stove door serve to define the nozzle opening to thereby direct a uniform flow of air across the entire inner surface of the window glass in the manner aforedescribed.

It is therefore an object of the present invention to provide a new and improved draft air deflecting device which has all of the advantages of the prior art devices and none of the disadvantages.

It is another object of the present invention to provide a draft air deflecting device which may be easily and economically manufactured.

It is a further object of the present invention to provide an efficient means of keeping the window glass of a stove clean during a combustion process.

It is still another object of the present invention to provide an efficient means of cooling the window glass of a stove during a combustion process.

It is yet another object of the present invention to heat the draft air being supplied to a combustion process prior to its use therein.

It is even another object of the present invention to provide an even and uniform flow of combustion air to a firebox.

It is a yet further object of the present invention to define a process whereby draft air being supplied to a combustion cycle may be heated prior to combustion and at the same time be utilized to clean and cool a window glass provided in a firebox.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a typical stove or fireplace insert having a window contained therein with which the present invention is employed.

FIG. 2 is a longitudinal sectional view of the stove or fireplace insert taken along the section line 2—2 in FIG. 1.

FIG. 3 is a detailed sectional view, on an enlarged scale, illustrating the association of the forwardly extending lip portion and the window to form a discharge nozzle for draft air.

FIG. 4 is a perspective view of the present invention mounted to an interior side of a stove door having a window therein.

DESCRIPTION OF THE PREFERRED EMBODIMENT

Referring now to the drawings and, in particular, to FIG. 1 where there is illustrated in perspective a conventional stove or fireplace insert having a window positioned therein and with which the present invention is designed to be employed. In this respect, the stove or fireplace insert which is generally designated by the reference numeral 10 includes a firebox 12 having a chimney connection flange or thimble 14 provided on a topmost portion thereof. The chimney connection flange 14 is in communication with the firebox interior 16, as more clearly illustrated in FIG. 2, and is designed to be directly attached to an existing chimney so that the products of combustion may be directed outwardly from the firebox interior.

The stove 10 further includes a firebox door 18 which is pivotally attached to the firebox 12 by means of a pair of hinges 20, 22 and is further provided with a handle 24 operable to lockingly close or open the door. In this connection, the opening and closing mechanism provided in the door 18 and associated with the handle 24 is of a conventional construction and forms no part of the present invention. The firebox door 18 is further provided with a window 26 and a pair of draft control knobs 28, 30. The window 26 is provided for the purpose of permitting light to be emitted from the firebox interior 16, as well as to permit a viewing by an operator or other interested person of a combustion process occurring therein. Similarly, the draft control knobs 28, 30 are provided for the purpose of regulating the amount of draft air which may be directed into the firebox interior 16 so as to support the combustion process. In this respect, the knobs 28, 30 are rotatably attached to the door 18 and are so positioned on the door as to selectively open and shut draft air inlet apertures 32 which are positioned beneath the knobs and which are in communication with the interior portion 16 of the firebox 12. All of the aforedescribed stove or fireplace insert structure is conventional and in and of itself does not constitute the present invention.

With particular reference to FIGS. 2 and 4, there is shown the draft air deflecting device 34 which essentially comprises the present invention and which is mounted either integrally or separably to an interior wall 36 of the door 18. In this connection, the draft air deflecting device 34 is illustrated as a box-like shaped structure having a hollow interior portion 38 into which draft air is directed through the draft air inlet apertures 32. As clearly illustrated, the incoming draft air follows the direction of the arrows 40 so as to be directed outwardly through a nozzle portion 42 integrally a part of the draft air deflecting device 34 and thence over an inside surface 44 of the window 26.

As can be more clearly understood with reference to both FIGS. 2 and 4 simultaneously, the draft air deflecting device 34 is in a sealing engagement with the interior portion 36 of the door 18 and is essentially comprised of a back wall 46, a pair of spaced apart, parallelly-aligned side walls 48, 50, a bottom wall 52 and the nozzle portion 42. Additionally, seal plates 47, 49 are provided at and fixedly attached to a topmost junction of side walls 50, 48 with back wall 46, respectively, to further enclose the deflecting device 34 in a sealing manner. In this connection, the deflecting device 34 is shown sealingly mounted to the interior 36 of the door 18 in FIG. 4 and it can be appreciated that incoming draft air can only escape from the hollow interior portion 38 by emission from the nozzle portion 42 in a manner which directs the same over the window interior surface 44. In the particular construction illustrated in FIG. 4, it can be seen that the window 26 is recessed into the door 18 in a manner whereby an edge 54 is defined, the width of said edge representing the distance that the interior surface 44 of the window lies from the interior surface 36 of the door 18. In view of this construction, the nozzle portion 42 of the draft air deflecting device 34 is constructed so as to extend partially over the edge 54 thereby to further enhance the flow of draft air across the interior window surface 44. The recess as defined by edge 54 serves to increase the efficiency of the present invention since the walls defined by the recess operate to control and enhance the movement of draft air across the window surface 44 by serving to prevent the same from being ejected too quickly into the firebox interior 16. In other words, the edge 54 operates to retard and thus reduce the speed of flow of the draft air away from the window interior 44 to thereby permit the draft air to further cool the window prior to its being used in combustion. It should be further noted with reference to FIG. 4 that the forwardly extending lip or nozzle 42 extends across an entire length of the window 26 so as to effectively permit an even, uniform flow of draft air over the entire surface 44 of the window.

Referring now to FIG. 3, the specific construction of the nozzle portion 42 can be ascertained. In this regard, it can be appreciated that air moving in the direction 40 is of a specific volume and is travelling at a specific speed or velocity while in the main hollow interior portion 38. However, once this specific volume of draft air enters the nozzle portion 42, in order for the same volume of draft air to pass through the nozzle opening 56 as was passing through the hollow interior portion 38, a substantial increase in speed or velocity is necessary. As such, the nozzle portion 42 operates to substantially accelerate the speed of the incoming draft air, while the vacuum created within the firebox interior 16 by the combustion process occurring therein serves to continuously draw draft air through the inlet apertures 32 and ultimately through the nozzle portion 42. This rapid movement of draft air across the window interior surface 44 serves to prevent the accumulation of soot, creosote and other particulates and further serves to rapidly and continuously remove heat therefrom.

In use, a fire may be started within the firebox interior 16 and the products of combustion associated therewith are directed outwardly to an unshown chimney which is attached to the chimney connection flange 14. Draft air is supplied to the combustion process by adjustment of the draft control knobs 28, 30 so as to permit an influx of draft air through the draft air apertures 32 thereby to support combustion. The incoming draft air first accumulates within the hollow interior portion 38 of the draft air deflecting device 34 and thence is directed through the nozzle portion 42 at a high velocity so as to clean and cool the window interior surface 44 in the manner aforedescribed.

Effectively then, the above described invention further describes a process for cleaning the interior window surface associated with a firebox door, such process being defined by the controlled collection of incoming draft air within a hollow chamber and then directing this collected draft air outwardly through a nozzle to thereby control the direction of movement thereof, as well as to accelerate its velocity in a manner which will prevent any excessive accumulation of heat or particulates on the window surface.

While the above described embodiment illustrates a preferred form of the present invention, it should be noted that it is not absolutely necessary that the draft air deflecting device 34 be positioned in the manner illustrated. In this regard, the nozzle portion 42 could be alternatively positioned at a topmost portion of the window 26, as well as on side portions thereof, or if desired, these nozzle portions could be positioned entirely around the edge of the window. Further, it should be noted that the size, shape and positioning of the box-like portion of the draft air deflecting device 34 is variable to a great extent without destroying the function of the present invention. Additionally, it is envisioned that the draft air deflecting device 34 might be constructed integrally with a firebox door 18 during an early manufacturing process, or in the alternative, these draft air deflecting devices could be manufactured of specific design and shape so as to be separably or integrally attached to existing firebox doors. As such, the optimum dimensional relationships for the parts of the invention are deemed readily apparent and obvious to one skilled in the art, and all equivalent relationships to those illustrated in the drawings and described in the specification are intended to be encompassed by the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A draft air deflecting device for use in combination with a firebox having a window therein, said draft air deflecting device comprising:

air chamber means for collecting a supply of draft air therein being ultimately suppliable to a combustion process occurring in said firebox;

nozzle means for directing said supply of draft air from said air chamber means across an interior surface of said window thereby to cool and clean said window prior to use of said draft air in said combustion process; and at least one draft air inlet aperture communicating with said air chamber means whereby draft air may be directed from an exterior area into said air chamber means for collection therein, said air chamber means being essentially a box-like structure in sealing engagement with said interior portion of said firebox and said nozzle means being fixedly attached to said box-like structure and contoured as a forwardly extending lip having an open portion through which said draft air is directed upon being emitted from said air chamber means.

2. The draft air deflecting device as defined in claim 1, wherein said air chamber means is mounted on an interior portion of said firebox and is located proximate to said window, said nozzle means being directed toward said window thereby to direct said draft air across said interior surface of said window.

3. The draft air deflecting device as defined in claim 1, wherein said at least one aperture is positioned in a door on said firebox.

4. The draft air deflecting device as defined in claim 1, wherein said window is recessed within said firebox thereby to define a recessed area communicating with said nozzle means so as to retard the flow of draft air being emitted through said nozzle means in a manner which enhances a cooling and cleaning of said window.

5. The draft air deflecting device as defined in claim 1, wherein said forward extending lip defining said nozzle means extends across an entire length of said window to thereby provide a uniform and even flow of draft air across said interior surface of said window.

6. The draft air deflecting device as defined in claim 1, wherein the amount of draft air suppliable to said air chamber means is controllable through the use of a draft air control knob associated with said at least one aperture.

7. The draft air deflecting device as defined in claim 1, wherein said air chamber means is mounted on an interior wall of said firebox and is located proximate to said window, said nozzle means directing air toward an entire surface of said window.

8. The draft air deflecting device as defined in claim 1, wherein said at least one aperture is positioned in a wall of said firebox.

9. The draft air deflecting device as defined in claim 1, wherein said window is recessed within said firebox for communicating with said nozzle means.

10. The draft air deflecting device as defined in claim 1, wherein said forward extending lip is mounted within a door and extends across an entire length of said window thereof to thereby provide a uniform and even flow of draft air across said interior surface of said window.

11. The draft air deflecting device as defined in claim 1, wherein a draft air control knob associated with said at least one aperture controls flow of draft air.

12. A draft air deflecting device for use in combination with a firebox having a window therein together with at least one draft air inlet aperture comprising:

a box-like structure means having essentially an open side thereof for engaging in substantial sealing relation with an interior portion of said firebox and forming an air chamber for collecting a supply of draft air received from at least one draft air inlet aperture communicating with an exterior area; and nozzle means fixedly attached to said box-like structure and contoured as a forwardly extending lip about an open portion of the nozzle means for directing said supply of draft air from said air chamber across an interior surface of said window thereby to cool and clean said window prior to said draft air being ultimately used in a combustion process occurring in said firebox.

13. A process for cleaning and cooling a window positioned within a door of a firebox, said process including the steps of:

intercepting a supply of draft air being provided from a source external of said firebox through at least one draft air inlet aperture and being utilizable to support a combustion process occurring within said firebox;

collecting said intercepted supply of draft air within an air chamber means;

directing said collected supply of draft air through a fixedly attached nozzle means so as to increase the velocity thereof; and further directing said collected air through said nozzle means including a forwardly extending lip and then across a surface of said window whereby said draft air serves to cool said window and also serves to remove soot, cresote and other particulates therefrom.

* * * * *